United States Patent
Sunderland et al.

(10) Patent No.: US 7,143,233 B2
(45) Date of Patent: Nov. 28, 2006

(54) DATA SEEK TECHNIQUE

(75) Inventors: William S. Sunderland, Chandler, AZ (US); Ricky L. Keahey, Vancouver, WA (US); Dominick A. Macchione, Freehold, NJ (US)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 10/813,244

(22) Filed: Mar. 29, 2004

(65) Prior Publication Data

US 2005/0216662 A1     Sep. 29, 2005

(51) Int. Cl.
*G06F 17/30* (2006.01)
*G06F 12/00* (2006.01)

(52) U.S. Cl. .............. 711/112; 711/154; 707/3

(58) Field of Classification Search .............. None
See application file for complete search history.

(56) References Cited

U.S. PATENT DOCUMENTS

| | | | | |
|---|---|---|---|---|
| 5,317,749 | A * | 5/1994 | Dahlen .............. | 710/200 |
| 5,819,310 | A * | 10/1998 | Vishlitzky et al. ......... | 711/114 |
| 2003/0204426 | A1 * | 10/2003 | Honarvar et al. ............. | 705/7 |
| 2004/0199683 | A1 * | 10/2004 | Asmuth ................... | 710/52 |

OTHER PUBLICATIONS

PCI-SIG "PCI Specifications," www.pcisig.com, copyright 2004; 18 pp.

"RAID Levels," www.pcguide.com/ref/hdd/perf/raid/levels/index-c.html, Apr. 17, 2001; 3 pp.

"Serial Direct Access Storage Device Subsystem," Chapter 16 of "Kernel Extensions and Device Programming Concepts," 2 pp; printed from http://csit1cwe.fsu.edu/doc_link/en_US/a_doc_lib/aixprggd/kernextc/serial_direct_storage.htm; web search dated Feb. 12, 2004.

"Serial DASD Subsystem Device Driver," Technical Reference: Kernel and Subsystems, vol. 2, 2 pp; printed from http://publib16.boulder.ibm.com/pseries/en_US/libs/ktechrf2/Serial_DASD_Subsystem.htm; web search dated Feb. 12, 2004.

"Storage: RAID is in the Details," www.n3labs.com/pdf/SE_C11_JUL_00.html; 12 pp.

Shanley, T. and D. Anderson, "PCI System Architecture, 4th edition," Mindshare, Inc., 1999; Chapters 1 & 2, 61 pp.

Stonebraker, M., "Data Base Research at Berkeley," 7 pp; printed from http://epoch.cs.berkeley.edu/postgres/papers/sigmodr90-ucb.pdf; web search dated Feb. 12, 2004.

* cited by examiner

*Primary Examiner*—Reginald Bragdon
*Assistant Examiner*—Thanh D. Vo
(74) *Attorney, Agent, or Firm*—Janaki K. Davda; Konrad Raynes & Victor, LLP

(57) ABSTRACT

Provided are techniques for locating data in a storage area. A request for data is received. Simultaneously, a search for the data is initiated on at least two storage areas using a different search technique for each storage area, wherein each storage area includes a copy of the data. The search on each of the storage areas is terminated when data is returned from one of the storage areas.

21 Claims, 3 Drawing Sheets

DATA SEEK TECHNIQUE

BACKGROUND

Conventional systems may include storage configurations with two Redundant Array of Independent Disks (RAID) devices, which may be referred to as RAID devices Level 1. Disk mirroring refers to a technique in which data is written to two duplicate disks simultaneously so that if one of the disk drives controlling one of the disks fails, another disk drive controlling the other disk may access a copy of the data. Thus, one of the RAID devices mirrors (i.e., stores copies of) the data of the other RAID device.

A software interface to a disk controller will tell the disk controller which track and sector to read from. To perform the read, the disk controller has to move a read/write head in or out to an appropriate track. The time that it takes to do this is called the seek time. Once the head is correctly positioned, the controller has to wait for the desired sector to spin around so it is under the head. This time is called the rotational delay.

Since the disk drive may receive many requests for reads and writes, the requests are queued. Then, there are several strategies for scheduling I/O events on a disk. For example, one strategy may be referred to as "Shortest Seek Time First", in which case when a new request arrives, seek distance of the new request from the current request being processed is calculated and the new request is placed into the queue accordingly. Then, the next closest access is serviced when the current request has been serviced. Another strategy may be referred to as "first come first served", in which case requests are processed in the order that they are received. Yet another strategy may be referred to as an "elevator algorithm," in which case requests come in to go to a particular track on a more or less random basis, and the read/write head goes in one direction as long as there are requests in that direction, and then goes in the other direction as long as there are requests in the other direction. At any given instant, the read/write head is either moving in toward the center of the disk or out toward the outside. If the read/write head can satisfy a new request by moving in the same direction, the read/write head does so, but if the read/write head has to switch directions and there are additional requests that could be satisfied without changing direction, the read/write head will not satisfy the new request until the read/write head turns around.

In order to locate data today, conventional systems implement a strategy for scheduling an I/O event on a disk on one of the RAID devices, while ignoring the other one of the RAID devices.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
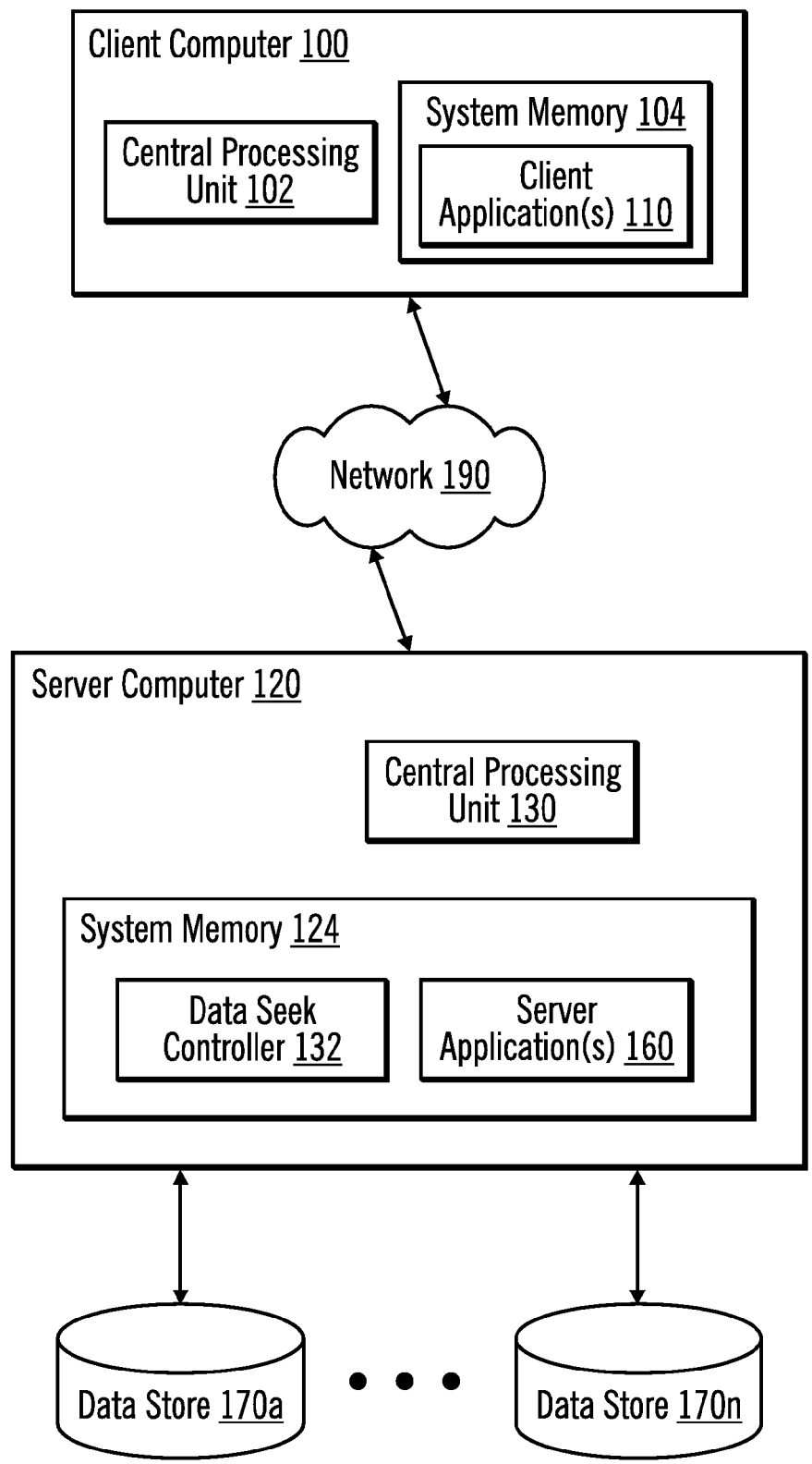
FIG. 1 illustrates computer system in accordance with certain embodiments.

FIG. 1 illustrates a computing environment in accordance with embodiments. A client computer 100 is connected via a network 190 to a server computer 120. The client computer 100 may comprise any computing device known in the art, such as a server, mainframe, workstation, personal computer, hand held computer, laptop telephony device, network appliance, etc. The network 190 may comprise any type of network, such as, for example, a Storage Area Network (SAN), a Local Area Network (LAN), Wide Area Network (WAN), the Internet, an Intranet, etc. The client computer 100 includes a Central Processing Unit (CPU) 102 and a system memory 104, which may be implemented in volatile and/or non-volatile devices. One or more client applications 110 may execute in the system memory 104.

The server computer 120 includes a Central Processing Unit (CPU) 122 system memory 124, which may be implemented in volatile and/or non-volatile devices. A data seek controller 132 executes in the system memory 124. In certain embodiments, the data seek controller 132 is disk controller hardware and software (e.g., RAID controller hardware with firmware). Additionally, one or more server applications 160 execute in system memory 124.

The server computer 120 provides the client computer 100 with access to data in a data stores 170a . . . 170n (where a, n, and the ellipses indicate that that are two or more data stores). Although data stores 170a . . . 170n are illustrated for ease of understanding, any number of data stores may be connected directly or indirectly (e.g., connected to another computer that is connected to server computer 120) to server computer 120.

The data stores 170a . . . 170n may each comprise a storage device or an array of storage devices, such as Direct Access Storage Devices (DASDs), Just a Bunch of Disks (JBOD), Redundant Array of Independent Disks (RAID), virtualization device, etc. Additionally, each data store 170a . . . 170n includes one or more storage areas.

Figure 2:
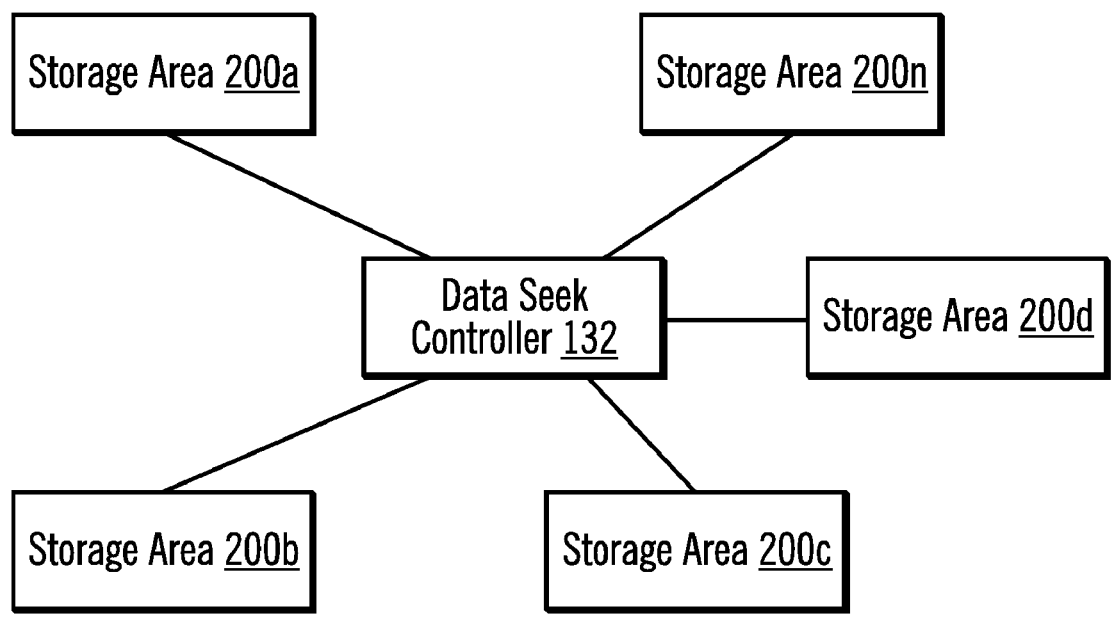
FIG. 2 illustrates computer system in accordance with certain other embodiments.

FIG. 2 illustrates a computer system in accordance with certain other embodiments. In FIG. 2, a data seek controller 132 is able to access storage areas 200a . . . 200n. At least one storage area may be connected (directly or indirectly) to, for example, any bus interface known in the art, such as a Peripheral Component Interconnect (PCI) bus or PCI express bus (PCI Special Interest Group, PCI Local Bus Specification, Rev 2.3, published March 2002). Although illustrated as separate components, storage areas 200a . . . 200n may be combined in any manner. For example, storage areas 200a and 200c may be located on one storage device, while storage area 200b may be located on another storage device. Also, the storage areas 200a . . . 200n may be attached to one or more computers (e.g., servers). The data seek controller 132 may be located at the same or different computer to which one or more storage areas 200a . . . 200n is attached.

Figure 3:
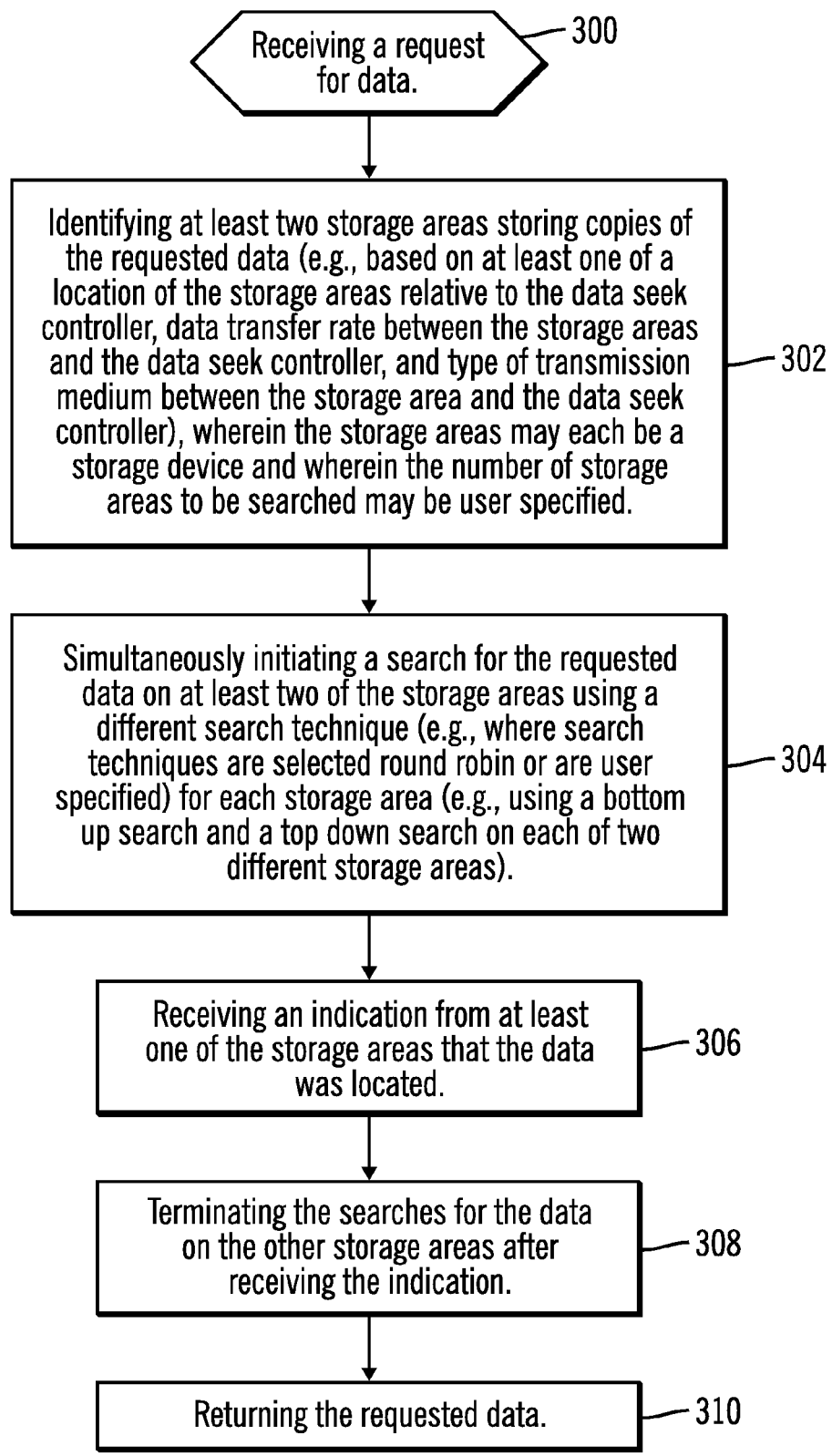
FIG. 3 illustrates operations to manage communications between devices in accordance with embodiments.

FIG. 3 illustrates operations to locate data in accordance with embodiments. Control begins at block 300 with receipt by the data seek controller 132 of a request for data. In certain embodiments, the request is a read request that provides a file name, a folder name, or other identifier for the requested data. In block 302, the data seek controller 132 identifies at least two storage areas storing copies of the requested data. In certain embodiments, the storage areas are storage devices (e.g., 170a and 170b). In certain embodiments, the identification is done by maintaining a list of identifiers (e.g., file names) in each storage area and receiving a request for data along with an identifier for the data that is used to identify the storage areas storing copies of the data with that identifier. In certain embodiments, two storage devices are provided, and these two storage devices mirror data to each other and these two storage devices are identified by default. In certain embodiments, the data seek controller 132 selects all storage areas that have copies of the data. In certain embodiments, the number of storage areas that are to be selected is user specified. There may be many copies of data in different storage areas at different locations, and, in certain embodiments, the storage areas to be searched are selected based on a variety of criteria (e.g., location of storage area relative to data seek controller 132, data transfer rate between the storage area and the data seek controller 132 or type of transmission medium between the storage area and data seek controller). For example, storage areas closest to the data seek controller 132 may be selected.

In block 304, the data seek controller 132 simultaneously initiates a search for the requested data on at least two of the storage areas using a different search technique on each storage area. In alternative embodiments, a different search technique is used for each storage area in varying storage environments made up of one or more storage areas (e.g., different SANs, JBODs, NAS devices, etc.), but a same search technique may be used in more than one storage environment. In certain embodiments, the data seek controller 132 selects the particular search technique to be applied based on, for example, a round robin technique. In certain embodiments, the particular search techniques to be used are user specified. In certain embodiments, at least two storage areas reside on two RAID Level 1 (also referred to as "RAID 1) storage devices accessible by the data seek controller 132, and a top down search is performed on one RAID 1 device while a bottom up search is performed on the other RAID 1 device.

In block 306, the data seek controller 132 receives an indication from at least one of the storage areas that the data was located. In block 308, the data seek controller 132 terminates the searches for the data on the other storage areas. In block 310, the data seek controller 132 returns the requested data.

In certain embodiments, a client application 110 sends a request for data to CPU 122 via CPU 102. The CPU 122 invokes the data seek controller 132 to retrieve the data. The data seek controller 132 retrieves and returns the data to the CPU 122, which returns the data to the client application 110 via CPU 102.

Thus, embodiments reduce seek time for storage configurations in which multiple copies of data are stored in different storage areas (e.g., in storage configurations that use RAID1 devices). Embodiments allow the search for data to occur simultaneously on multiple storage areas using different search techniques. For example, with two RAID1 devices, a bottom-up search is performed on one RAID1 device and a top-down search is performed on the other RAID1 device, which results in decreasing seek time by 50% on average.

ADDITIONAL EMBODIMENT DETAILS

The described embodiments may be implemented as a method, apparatus or article of manufacture using programming and/or engineering techniques to produce software, firmware, hardware, or any combination thereof. The term "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art. Additionally, the devices, adaptors, etc., may be implemented in one or more integrated circuits on the adaptor or on the motherboard.

The illustrated operations of FIG. 3 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or limiting. Many modifications and variations are possible in light of the above teachings.

What is claimed is:

1. A method for locating data in a storage device, comprising:
    receiving a request for data;
    simultaneously initiating a search for the data on at least two storage areas using a different search technique for each storage area, wherein each storage area includes a copy of the data, wherein each search technique specifies a technique for locating the data on a storage area, wherein the at least two storage areas are located on two separate storage devices, and wherein the search technique for a first of the at least two storage areas is a top down search and wherein the search technique for a second of the at least two storage areas is a bottom up search; and
    in response to receiving an indication from at least one of the storage areas that the data was located, terminating the search on each of the other storage areas.

2. The method of claim 1, further comprising:
    identifying the at least two storage areas that include the copy of the data.

3. The method of claim 2, further comprising:
    identifying the at least two storage areas to be searched based on at least one of a location of the storage areas relative to a data seek controller, data transfer rate between the storage areas and the data seek controller, and type of transmission medium between the storage area and the data seek controller.

4. The method of claim 1, wherein the number of storage areas to be searched is user specified.

5. The method of claim 1, wherein each search technique is selected in a round robin manner.

6. The method of claim 1, wherein each search technique is user specified.

7. The method of claim 1, further comprising:
returning the data in response to the request.

8. A system, comprising:
a first storage area coupled to a bus;
a second storage area;
circuitry operable to:
  receive a request for data;
  simultaneously initiate a search for the data on the first storage area and the second storage area using a different search technique for each storage area, wherein each storage area includes a copy of the data, wherein each search technique specifies a technique for locating the data on a storage area, wherein the at least two storage areas are located on two separate storage devices, and wherein the search technique for a first of the at least two storage areas is a top down search and wherein the search technique for a second of the at least two storage areas is a bottom up search; and
  in response to receiving an indication from one of the storage areas that the data was located, terminate the search on the other storage area.

9. The system of claim 8, wherein the circuitry is operable to:
identify the first storage area and the second storage area that include the copy of the data.

10. The system of claim 9, wherein the circuitry is operable to:
identify the first storage area and the second storage area to be searched based on at least one of a location of the storage areas relative to the circuitry, data transfer rate between the storage areas and the circuitry, and type of transmission medium between the storage area and the circuitry.

11. The system of claim 8, wherein the number of storage areas to be searched is user specified.

12. The system of claim 8, wherein each search technique is selected in a round robin manner.

13. The system of claim 8, wherein each search technique is user specified.

14. The system of claim 8, wherein the circuitry is operable to:
return the data in response to the request.

15. An article of manufacture embodied as one of hardware logic and a computer readable medium for locating data in a storage device, wherein the article of manufacture is operable to:
receive a request for data;
simultaneously initiate a search for the data on at least two storage areas using a different search technique for each storage area, wherein each storage area includes a copy of the data, wherein each search technique specifies a technique for locating the data on a storage area, wherein the at least two storage areas are located on two separate storage devices, and wherein the search technique for a first of the at least two storage areas is a top down search and wherein the search technique for a second of the at least two storage areas is a bottom up search; and
in response to receiving an indication from at least one of the storage areas that the data was located, terminate the search on each of the other storage areas.

16. The article of manufacture of claim 15, wherein the article of manufacture is operable to:
identify the at least two storage areas that include the copy of the data.

17. The article of manufacture of claim 16, wherein the article of manufacture is operable to:
identify the at least two storage areas to be searched based on at least one of a location of the storage areas relative to a data seek controller, data transfer rate between the storage areas and the data seek controller, and type of transmission medium between the storage area and the data seek controller.

18. The article of manufacture of claim 15, wherein the number of storage areas to be searched is user specified.

19. The article of manufacture of claim 15, wherein each search technique is selected in a round robin manner.

20. The article of manufacture of claim 15, wherein each search technique is user specified.

21. The article of manufacture of claim 15, wherein the article of manufacture is operable to:
return the data in response to the request.

* * * * *